(12) United States Patent
Belanger

(10) Patent No.: US 6,745,098 B2
(45) Date of Patent: Jun. 1, 2004

(54) MACHINING BASED ON MASTER PROGRAM MERGED FROM PARTS PROGRAMS

(75) Inventor: Joseph William Belanger, Cambridge, MA (US)

(73) Assignee: Shapex Solid Image Systems LP, Cambridge, MA (US)

( * ) Notice: Subject to any disclaimer, the term of this patent is extended or adjusted under 35 U.S.C. 154(b) by 294 days.

(21) Appl. No.: 09/736,102

(22) Filed: Dec. 13, 2000

(65) Prior Publication Data

US 2002/0072823 A1 Jun. 13, 2002

(51) Int. Cl.[7] .............................................. G06F 19/00
(52) U.S. Cl. ...................................... 700/169; 700/159
(58) Field of Search ................................ 700/159, 169, 700/179, 180, 176, 184, 186, 193

(56) References Cited

U.S. PATENT DOCUMENTS

| | | | | |
|---|---|---|---|---|
| 3,668,653 A | * | 6/1972 | Fair et al. ....................... | 700/1 |
| 3,882,304 A | | 5/1975 | Walters ....................... | 700/163 |
| 4,572,998 A | * | 2/1986 | Nozawa et al. ............. | 318/572 |
| 5,321,874 A | | 6/1994 | Mills et al. .................. | 29/33 P |
| 5,368,539 A | | 11/1994 | Mills et al. .................... | 483/1 |
| 5,392,502 A | * | 2/1995 | Freer .............................. | 29/52 |
| 6,067,695 A | * | 5/2000 | Momoitio ................... | 29/26 A |
| 6,070,106 A | * | 5/2000 | Hall ............................. | 700/95 |
| 6,101,425 A | * | 8/2000 | Govindaraj et al. ........ | 700/181 |
| 6,112,133 A | * | 8/2000 | Fishman ..................... | 700/182 |
| 6,144,895 A | * | 11/2000 | Govindaraj et al. ........ | 700/181 |
| 6,157,869 A | * | 12/2000 | Matsumura et al. ........ | 700/178 |
| 6,401,005 B1 | * | 6/2002 | Schwarz et al. ............ | 700/159 |
| 6,470,377 B1 | * | 10/2002 | Sevcik et al. ............... | 709/201 |
| 6,502,002 B2 | * | 12/2002 | Susnjara et al. .............. | 700/95 |
| 2002/0002516 A1 | * | 1/2002 | Sakayori et al. .............. | 705/29 |

FOREIGN PATENT DOCUMENTS

EP   0 583 085 A2   2/1994

OTHER PUBLICATIONS

Junker "The All–Rounder for High–Precision End Machining" pp. 1–2.*
Melissa Lipowski. "Faster Speeds and Feeds Aren't The Only Ways to Slash Cycle Times". American Machinist, vol. 143, No. 11, Nov. 1999, pp. 80–84.

* cited by examiner

Primary Examiner—Leo Picard
Assistant Examiner—Chad Rapp
(74) Attorney, Agent, or Firm—Fish & Richardson P.C.

(57) ABSTRACT

A machining system is described having independently movable cutting instruments configured to simultaneously generate different parts. The cutting instruments are capable of independent motion along a Z-axis and are mounted on a common beam that traverses the parts in an X, Y plane. Merge software modules merge a number of part programs into a single master program. A control unit interprets the master program and controls the machining system to generate the parts. The software modules generate the master program such that all of the Z-axis move commands within the part programs are sequenced along a single X, Y traverse path based on a defined cutting strategy and cutting direction. In this manner, the machining system simultaneously produces a number of different parts.

41 Claims, 9 Drawing Sheets

Multi-Z Merge Job Example (All CNC Program Initialization and Non-move Commands Removed for Simplicity)

CNC PROGRAM # 1

(Assigned Z Tool "A")

```
N01 G0 X+0.0 Y+0.0 Z+0.0
N02 G1 X+0.2 Y+0.0 Z+0.0
N03 G1 X+0.3 Y+0.0 Z-0.1
N04 G1 X+0.4 Y+0.0 Z-0.2
N05 G1 X+0.5 Y+0.0 Z-0.3
N06 G1 X+0.6 Y+0.0 Z-0.4
N07 G1 X+0.7 Y+0.0 Z-0.5
N08 G1 X+1.7 Y+0.0 Z-0.5
N09 G1 X+1.8 Y+0.0 Z-0.4
N10 G1 X+1.9 Y+0.0 Z-0.3
N11 G1 X+2.0 Y+0.0 Z-0.2
N12 G1 X+2.1 Y+0.0 Z-0.1
N13 G1 X+2.2 Y+0.0 Z+0.0
N14 G1 X+2.4 Y+0.0 Z+0.0
```

CNC PROGRAM # 2

(Assigned Z Tool "B")

```
N01 G0 X+0.0 Y+0.0 Z+0.0
N02 G1 X+0.5 Y+0.0 Z+0.0
N03 G1 X+0.5 Y+0.0 Z-0.0
N04 G1 X+0.6 Y+0.0 Z-0.1
N05 G1 X+0.7 Y+0.0 Z-0.2
N06 G1 X+0.8 Y+0.0 Z-0.3
N07 G1 X+0.9 Y+0.0 Z-0.4
N08 G1 X+1.0 Y+0.0 Z-0.5
N09 G1 X+1.4 Y+0.0 Z-0.5
N10 G1 X+1.5 Y+0.0 Z-0.4
N11 G1 X+1.6 Y+0.0 Z-0.3
N12 G1 X+1.7 Y+0.0 Z-0.2
N13 G1 X+1.8 Y+0.0 Z-0.1
N14 G1 X+1.9 Y+0.0 Z+0.0
N15 G1 X+2.4 Y+0.0 Z+0.0
```

CNC PROGRAM # 3

(Assigned Z Tool "C")

Multi-Z Merge-Job Example

(CNC Programs #1, #2, #3 Merged as Z Tools A, B, C)

SAMPLE REPORT

SSIS_MERGE-JOB #AQRT215002 SUMMARY REPORT

8/6/00 1:30 PM
User ID  James Jones

| Group ID | Group X Home Position | Group Y Home Position | Path Step Size | Step Over Size | Cutting Strategy | Cutting Direction | Master Template Size (X) | Master Template Size (Y) | CNC Program ID | Assigned Z Tool Number | Total X Inches | Total Y Inches | Total Z Inches |
|---|---|---|---|---|---|---|---|---|---|---|---|---|---|
| A140 | 0.00 | 0.00 | 0.01670 | 0.01670 | PX | RA | 6.25 | 3.75 | C263 | 1 | 1,256 | 865 | 387 |
| | | | | | | | | | C245 | 2 | 907 | 657 | 452 |
| | | | | | | | | | C135 | 3 | 1,768 | 1,342 | 878 |
| | | | | | | | | | C687 | 4 | 409 | 351 | 675 |
| | | | | | | | | | | Gp Total | 4,340 | 3,215 | 2,392 |
| A141 | 0.00 | 22.50 | 0.00700 | 0.00700 | CR | CO | 4.00 | 4.00 | C175 | 1 | 578 | 432 | 546 |
| | | | | | | | | | C643 | 2 | 259 | 134 | 245 |
| | | | | | | | | | C345 | 3 | 753 | 567 | 645 |
| | | | | | | | | | C709 | 4 | 387 | 324 | 456 |
| | | | | | | | | | | Gp Total | 1,977 | 1,457 | 1,892 |
| B323 | 7.00 | 0.00 | 0.01300 | 0.01300 | PY | CL | 4.00 | 5.00 | C547 | 1 | 679 | 765 | 324 |
| | | | | | | | | | C987 | 2 | 365 | 367 | 356 |
| | | | | | | | | | C375 | 3 | 762 | 542 | 276 |
| | | | | | | | | | C129 | 4 | 654 | 652 | 347 |
| | | | | | | | | | | Gp Total | 2,460 | 2,326 | 1,303 |
| | | | | | | | | | | Job Total | 8,777 | 6,998 | 5,587 |

FIG. 9

MACHINING BASED ON MASTER PROGRAM MERGED FROM PARTS PROGRAMS

TECHNICAL FIELD

This invention relates to machining.

BACKGROUND

A machining system typically includes a precision cutting instrument, such as high-speed spindle, for processing a work piece to produce a mechanical part. A control unit within the machining system interprets a "part program" that includes a series of machine movement commands for directing the cutting instrument to traverse the work piece and ultimately produce the desired part. The control unit processes each command sequentially until the end of the program has been reached.

For each command, the control unit moves the cutting instrument within a space defined by a three-dimensional coordinate system noted as X, Y and Z. The X and Y-axis are typically oriented to form a horizontal plane while the Z-axis represents the vertical axis perpendicular to the X, Y plane. The machining system is designed to position its cutting instrument at any coordinate point within the area bounded by the X and Y axes. Additional commands operate other functions of the machining system such as tool selection, speed and coolant flow.

The cutting instrument starts at an initial starting position, typically location 0,0,0, and moves along the three axes sequentially, command by command, until all of the commands are executed. Three-dimensional parts are produced by placing the work piece on the X, Y plane and removing a portion of the work piece with the cutting instrument as it traverses along the X, Y plane. Continued repeated moves in the X direction, the Y direction and the Z-axis allow the cutting mechanism to traverse any three-dimensional profile until the part is fully achieved. The motion of the cutting instrument over the work piece is referred to as a tool path, collectively formed by as series of tool path segments. When the end of a specific tool path segment is reached, the cutting instrument is typically commanded to "step-over" an offset in the X direction or the Y direction. This offset is referred to as the distance between the tool paths. The cutting instrument then makes another pass over the work piece along an adjacent tool path segment. At specific locations along the tool paths, the commands direct the cutting instrument to traverse in the X, Y plane and also move along the Z-axis. This process continues until all of the tool path segments have been traversed and the part has been produced.

Many conventional machining systems operate in this manner to produce three-dimensional parts one at a time. Some machining systems have more than one cutting mechanism fixed to the Z-axis on a common beam and can produce several copies of a three-dimensional part at the same time.

SUMMARY

Generally, the invention is directed to a machining system having a plurality of independently movable precision cutting instruments configured to simultaneously generate a number of different parts. In one embodiment, the cutting instruments are capable of independent motion along the Z-axis and are mounted on a common beam that traverses the parts in an X, Y plane. Merge software modules merge a number of part programs into a single master program. A control unit interprets the master program and controls the machining system to generate the parts. The software modules generate the master program such that all of the Z-axis move commands within the separate part programs are sequenced along a single X, Y traverse path based on a defined cutting strategy and cutting direction. In this manner, the machining system simultaneously produces a number of different parts.

According to another aspect, the invention is directed to a method in which a plurality of part programs are merged into a master part program. The machining system is controlled according to the master part program in order to simultaneously produce a plurality of parts. To merge the part programs, a group starting point is calculated for all of the cutting instruments. All Z-axis move commands within the part programs are identified and modified such that an X, Y location in the master part program for each Z-axis move command is computed relative to the calculated starting point. A set of X, Y master program move commands is then generated to sequentially move the cutting instruments to the modified X, Y locations of the combined Z-axis move commands.

Various embodiments of the invention are set forth in the accompanying drawings and the description below. Other features and advantages of the invention will become apparent from the description, the drawings, and the claims.

BRIEF DESCRIPTION OF THE DRAWINGS

FIG. 2 illustrates three example part programs.

FIG. 3 illustrates an example master program formed according to the invention.

FIG. 9 illustrates an example merge report.

DETAILED DESCRIPTION

Figure 1:
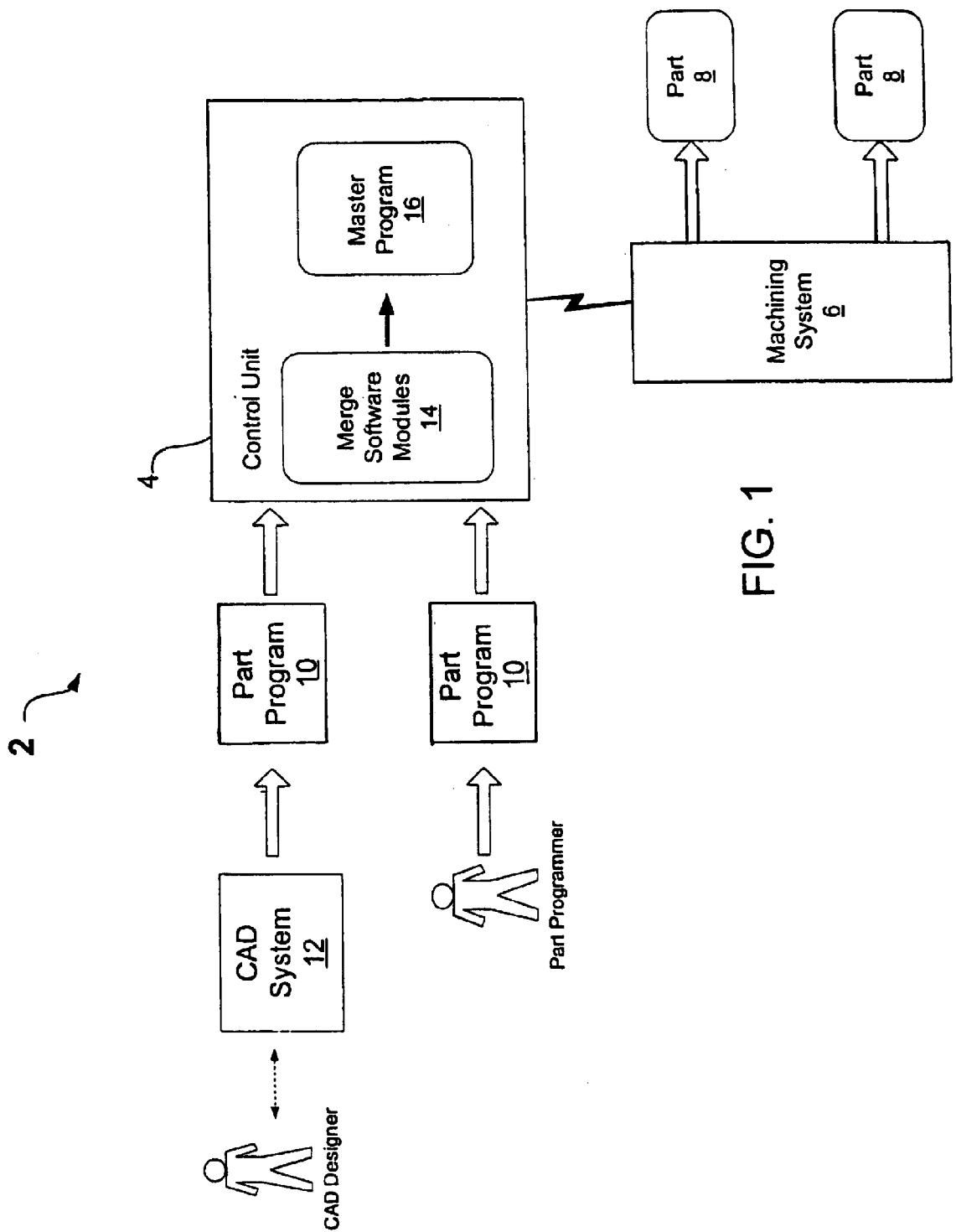
FIG. 1 is a block diagram illustrating a system capable of simultaneously machining different three-dimensional parts.

FIG. 1 is a block diagram illustrating a system 2 capable of simultaneously machining different three-dimensional parts 8. System 2 includes control unit 4 coupled to machining system 6, which has multiple cutting instruments mounted at variable distances from each other on a common beam. The cutting instruments are capable of independent motion along the Z-axis while the common beam traverses the X, Y plane. Alternatively, the common beam and a material support table travel in the X, Y plane. Each cutting instrument removes material from a different work piece in a manner that enables machining system 6 to produce a number of unique parts 8 simultaneously.

Control unit 4 receives a number of different part programs 10. Each part program 10 corresponds to a part 8 and conforms to conventional standards for defining part programs such that it could be run on any conventional machining system without modification to produce a single part. Control unit 4 merges part programs 10 into a master program 16 and controls machining system 6 according to master program 16 to simultaneously produce parts 8. In this manner, machining system 6 can produce completely different multiple three-dimensional parts 8 at the same time on the same machining system 2. In one configuration, control unit 4 comprises two computing systems (not shown) including a first computing system for executing merge software modules 14 to form master program 16 and a second computing for controlling machining system 6 according to master program 16.

Part programs 10 can be generated manually by a part programmer interacting directly with control unit 4 or produced with the aid of a Computer Aided Design (CAD) system 12. As discussed in detail below, master program 16 incorporates all of the Z-axis move commands that are contained within the individual part programs 10 and logically sequences the commands along common X, Y traverse paths. Thus, control unit 4 generates master program 16 such that each cutting mechanism traverses the X, Y plane in a common fashion. Movements in the Z direction, however, can be unique to each individual part 8. This common X, Y movement and the independent Z movements produce a set of parts 8 simultaneously, referred to herein as a part group. Multiple groups can be defined within master program 16 and are collectively referred to as a job.

Typically, the commands within each individual part program 10 are configured to direct a cutting mechanism to make multiple passes over the tool paths using different sized tool bits. Control unit 4 generates the master program 16 such that all of the different parts 8 are processed for a given tool bit size before the cutting instruments proceed to the next tool bit size. When all of the tool bit sizes have been processed for all of the groups defined within the master program 16, the job is complete.

Figure 2:
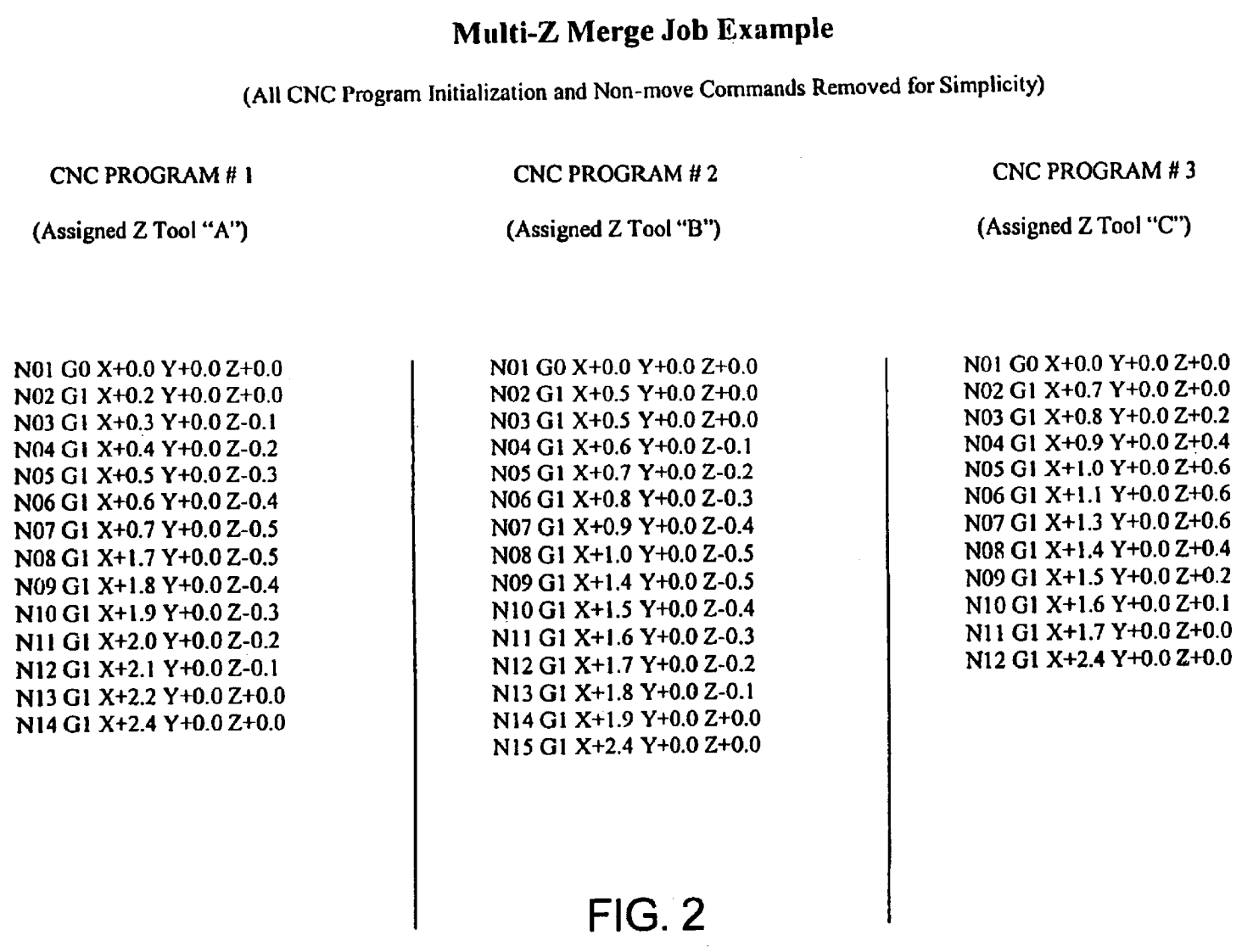

FIG. 2 illustrates three example part programs. Each of the example part programs includes a first command that directs a cutting instrument to start from location 0,0,0. The remaining commands in the example part programs direct the cutting instruments over a single tool path. Notably, each command specifies a location according to a three-dimensional coordinate system having X, Y and Z axes. For simplicity, all non-move commands, such as tool bit selection commands, have been removed from the example part programs.

Figure 3:
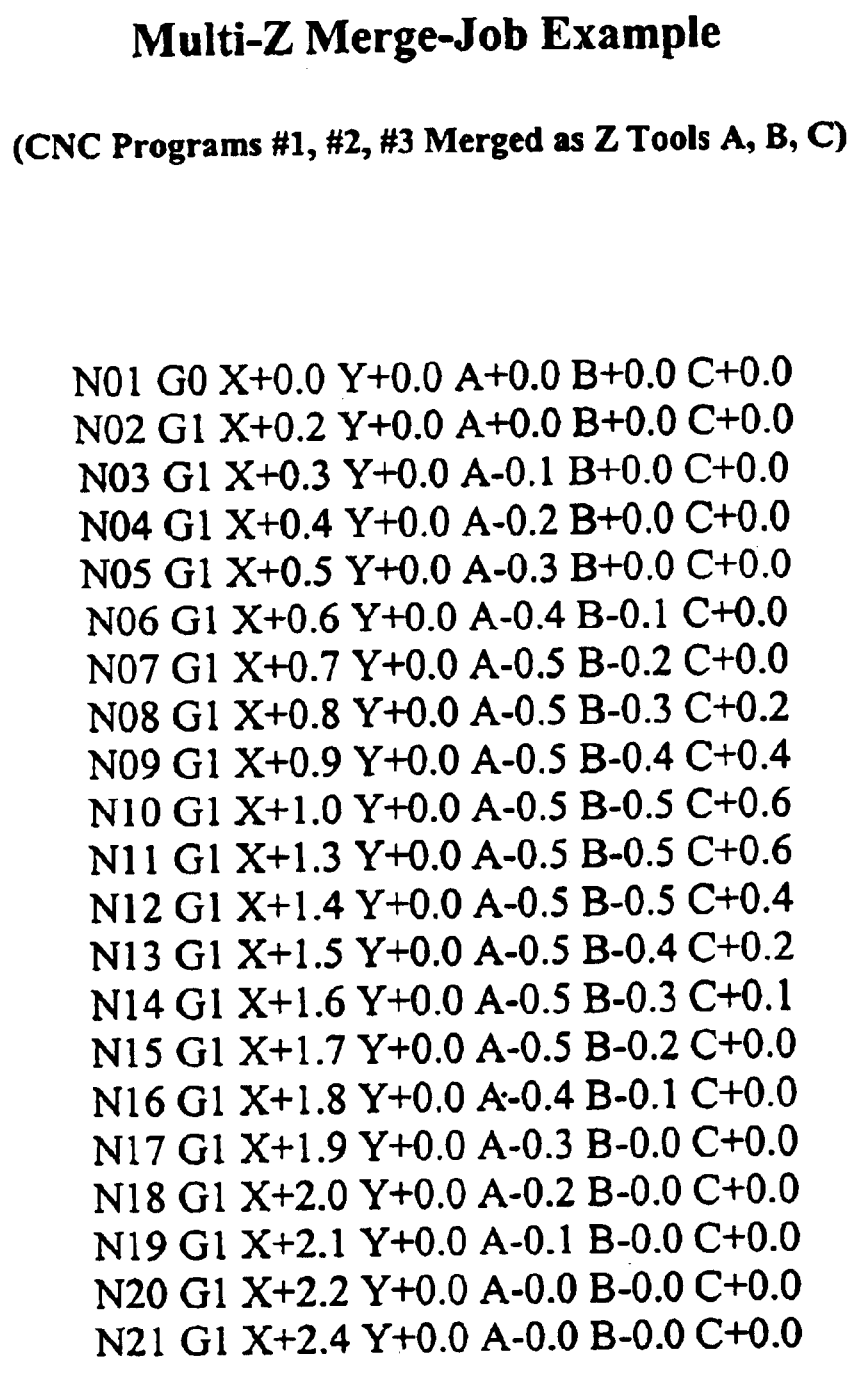

FIG. 3 illustrates an example master program formed by merging the example part programs of FIG. 2 according to the invention. As illustrated in FIG. 3, the example master program comprises 21 move commands that direct three cutting instruments A, B, and C along a tool path according to a common X, Y movement. Each cutting instrument, however, can independently move in the z-axis. Each command specifies an X location, a Y location and three Z-axis locations for cutting instruments A, B and C, respectively. For example, the first command directs all three cutting instruments to start from location 0,0,0. The second command directs each cutting instrument to move to location 0.2, 0.0 in the X, Y plane without moving along the z-axis. The third command directs each cutting instrument to move to the 0.3, 0.0 location in the X, Y plane but directs cutting instruments A, B and C to move to −0.1, 0.0 and 0.0 along the Z-axis, respectively.

Figure 4:
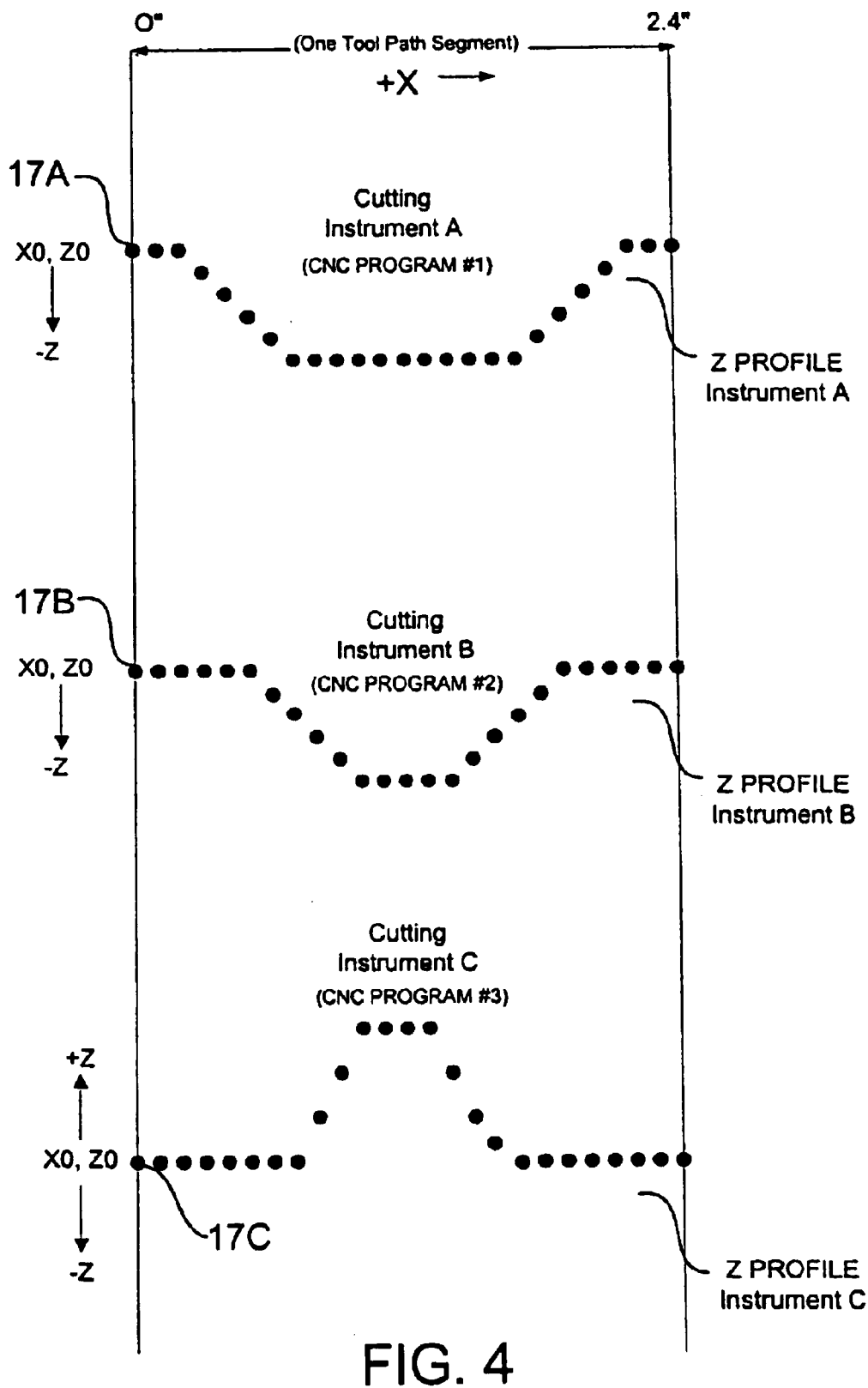
FIG. 4 illustrates an example tool path segment for three cutting instruments controlled according to the master program of FIG. 3.

FIG. 4 illustrates a single tool path segment cross-section as traversed by cutting instruments A, B, and C according to the example master program illustrated in FIG. 3. Specifically, cutting instruments A, B and C start from initial positions 17A, 17B and 17C, respectively, and move in the positive X direction (horizontally across FIG. 4) in a common manner. The cutting instruments move independently in the Z direction according to the three Z-axis locations specified by each command. In the illustrated example, the location of the cutting instruments A, B and C are plotted along their corresponding tool paths in 0.1" increments.

Figure 5:
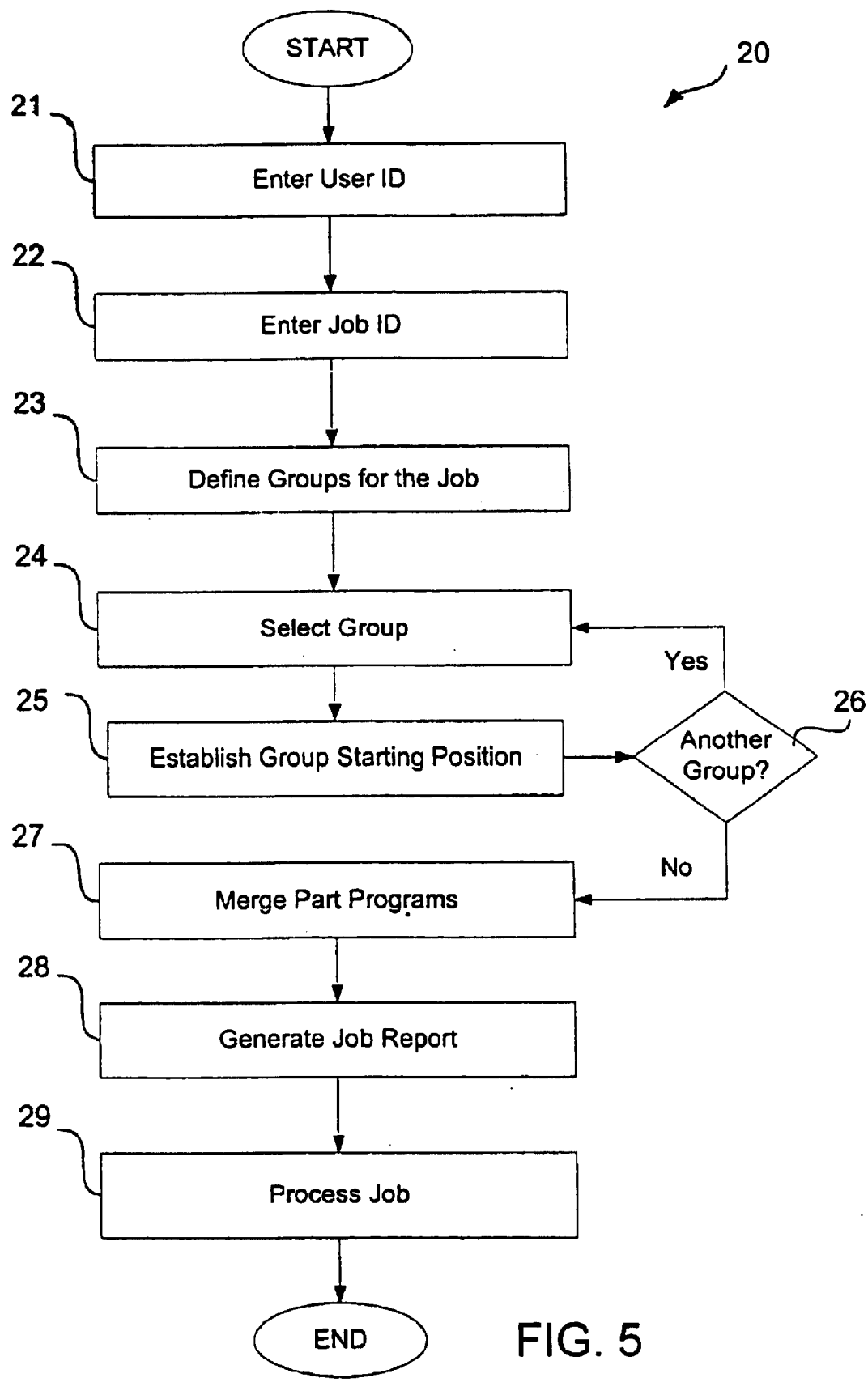
FIG. 5 is a flowchart of an example process in which the system processes a number of part programs and produces a number of different parts.

FIG. 5 is a flowchart of an example process 20 in which system 2 processes a number of part programs 10, such as the example part programs described above, to simultaneously produce a number of different parts 8. First, an operator accesses control unit 4 and enters a unique user identification (step 21). Next, the operator creates a new job and enters a unique identifier for the job (step 22). After creating the unique job identifier, the operator interacts with control unit 4 to define one or more groups of parts 8, as described in detail below with reference to FIG. 3 (step 23). The operator then selects one or more groups that he or she wishes to include in the new merge job. To select a previously defined group to include within the merge job, the operator enters the group's unique identifier (step 24) and establishes a starting position for the group (step 25). To establish the group's starting position, the operator inputs a three-dimensional location for the group relative to home (0,0,0). After adding the group to the job, the operator can elect to include another group (step 26) and repeat the process.

Once all of the groups have been added to the job, merge software modules 14 process the part programs 10 and merge them into master program 15 (step 27). After merging the part programs 10, merge software modules 14 generate a job report summarizing various processing data and statistics for master program 16 (step 28). At this point, control unit 4 interprets master program 16 and operates machining system 6 in order to simultaneously produce parts 8 (step 28).

Figure 6:
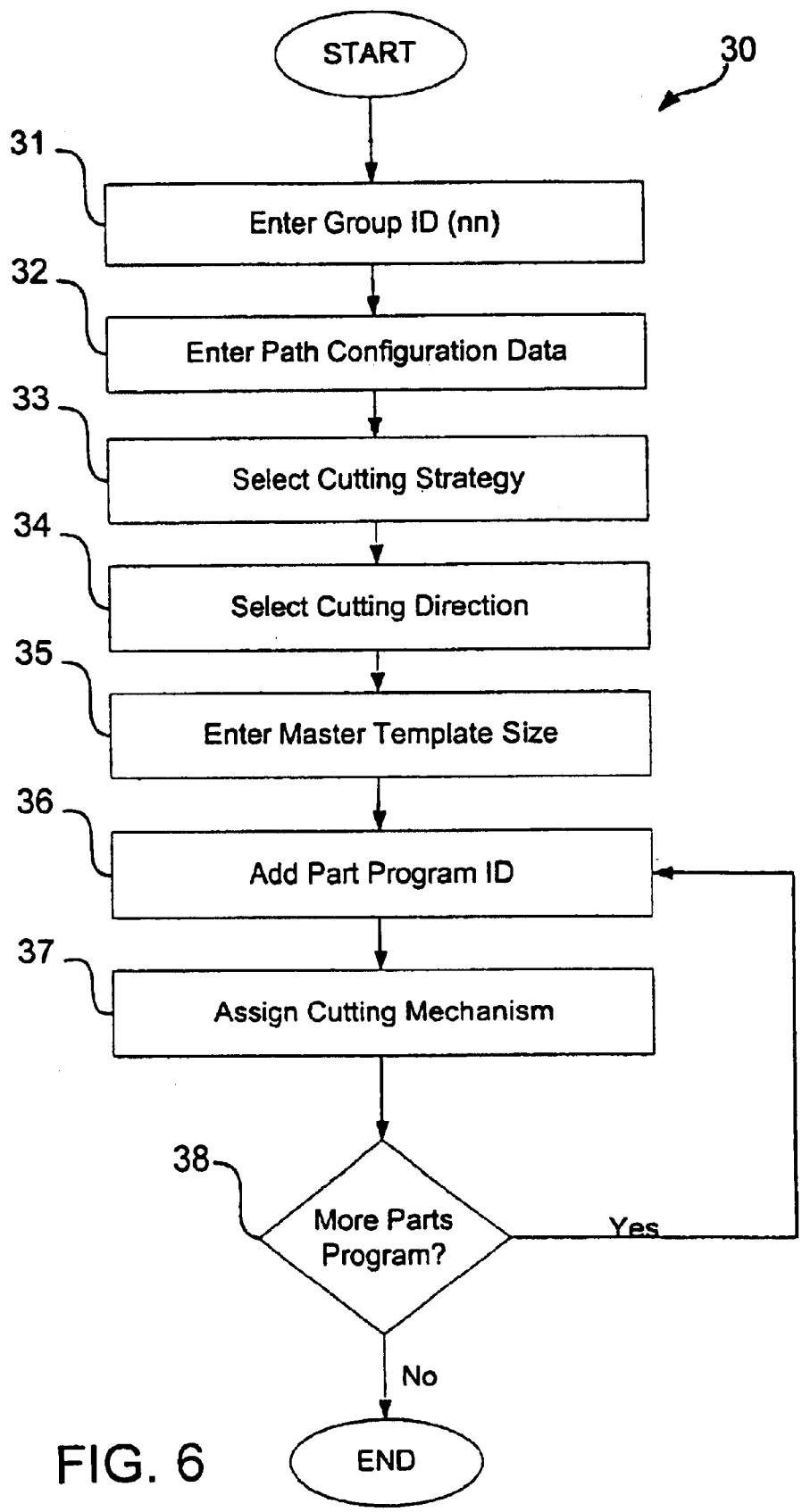
FIG. 6 is a flowchart of an example process of defining a new part group.

FIG. 6 is a flowchart of an example process 20 illustrating how an operator can interact with control unit 4 in order to define a new group. Initially, the operator creates a unique group identifier, either by entering an identifier manually (step 31). Next, the operator enters various path configuration data such as a movement step size and a distance between tool paths for the corresponding cutting instruments (step 32). The operator then selects a cutting strategy (step 33). For example, the operator can select between: (1) parallel cutting along the X-axis, (2) parallel cutting along the Y-axis, and (3) crosswise cutting first along the X-axis and then along the Y-axis. Next, the operator selects a cutting direction (step 34). For example, the operator can select between: (1) raster, in which the cutting mechanism cuts in both positive and negative X/Y directions, (2) conventional, in which the cutting mechanism cuts in positive X/Y directions only and rapidly returns in negative X/Y directions, and (3) climb, in which the cutting mechanism cuts in negative X/Y directions only and rapidly returns in positive X/Y directions.

After selecting a cutting direction, the operator enters a template size for the master program 16 defining an X-axis size and a Y-axis size (step 35). After configuring the group (steps 31 through 35), the operator selects a part program 10 for inclusion in the group (step 36) and assigns the part program 10 to a cutting mechanism (step 37). The operator repeats this process until all of the desired part programs 8 have been included in the group (step 38), at which time the operator has completed the definition of a group.

Figure 7:
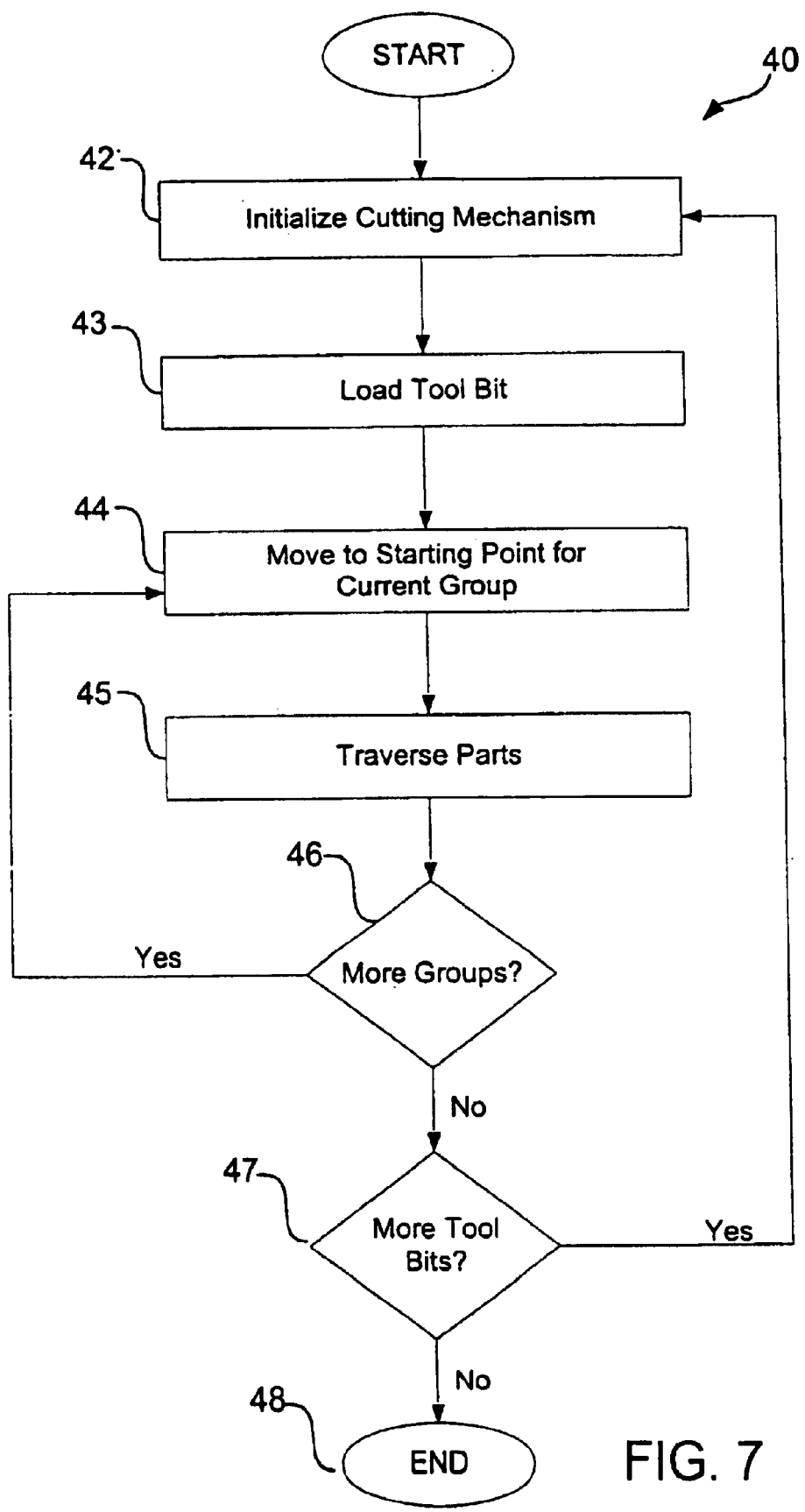
FIG. 7 is a flowchart illustrating processing a master program to produce a number of different parts.

FIG. 7 is a flowchart illustrating a process 40 in which control unit 2 process master program 16 in order to simultaneously produce parts 8. In a typical operation, control unit 4 starts by initializing in a HALT state at a HOME location with all of the cutting instruments in a fully retracted position (step 42) such that an operator, or an automatic tool-changer, can load an initial tool bit of a first tool bit size into each of the different cutting instruments (step 43).

Next, control unit 4 processes the master program 16 to direct machining system 6 to move the cutting mechanism to a group starting point (step 44). Control unit 4 then moves each cutting mechanism along the merged tool paths for the first programmed tool bit size (step 45). After completing the merged tool paths using the first tool bit size, each cutting mechanism is directed to return to its corresponding original starting point.

If master program 16 contains additional groups, control unit 4 moves the cutting instruments to a starting point for the next group (step 44) and along the merged tool paths for the same tool bit size (step 45). Control unit 4 continues this process until all of the groups within the job are processed for the current tool bit size.

Upon processing all of the groups in the job, control unit 4 determines whether additional tool sizes are required (step 47). If so, control unit 4 returns the cutting instruments to the HOME position and enters the HALT state with all of the cutting instruments fully retracted (step 42). This allows the operator, or an automatic tool-changer, to install the next size tool bits in all of the cutting instruments (step 43). When the tool bits have been installed, the control unit 4 begins the process again for the new tool bit size and repeats the above-described process until all the required tool bit sizes have been processed for all groups. Upon completion, control unit 4 returns the cutting instruments to the HOME position and directs machining system to enter a STOP state (step 48).

As noted above, each part program 10 to be merged into a specific job is by itself a conventional program conforming to industry standards. Several logical constraints, however, can expedite the merging process, although they are not specifically required for different groups within a single merge job. For example, merging the part programs 10 is expedited when each part program 10 for a given group employs the same tool motion strategy. Different strategies may be used between groups within a specific a common job, but only one of those strategies is used at any one time for a specific group.

Another logical constraint, for example, is that each part program 10 of a specific group, and all groups to be merged into a specific job, should employ the same tool bit size sequence and calls for each tool using the same tool identifier, such as Ti for a first tool size and T2 for a second tool size. Each part program 10 of a specific group of a specific job also uses the same step size along the tool path and the same distance between the tool paths.

Furthermore, machine tool commands such as spindle speed, coolant flow, and other initial setup commands should appear at the beginning of master program 16, as consistent with industry standards. These commands should be the same for each part program 10 within a specific group. Similarly, feedrate commands for X, Y-axis movements should be the same for each part program 10 of a specific group. Ultimate feedrates, however, for all axes are computed by the machine controller consistent with industry standards.

Rapid traverse commands generally should not be used in part programs 8 that are to be merged into a specific job. Instead, as explained in detail below, merge software modules 14 insert a set of new rapid traverse commands based upon the specific Z-axis move requirements, the chosen cutting strategy, the chosen cutting direction, and the template X, Y traverse area for each group in the job.

Finally, each part program 10 in a specific job should have the same X, Y, Z zero position with respect to the physical work piece. According to conventional industry standards, for example, the zero position is defined as upper left near corner when facing the front of the machine. As such, a positive X movement moves to the right, a positive Y movement moves in toward the machine, and a positive Z movement moves up along the tool spindle.

Figure 8:
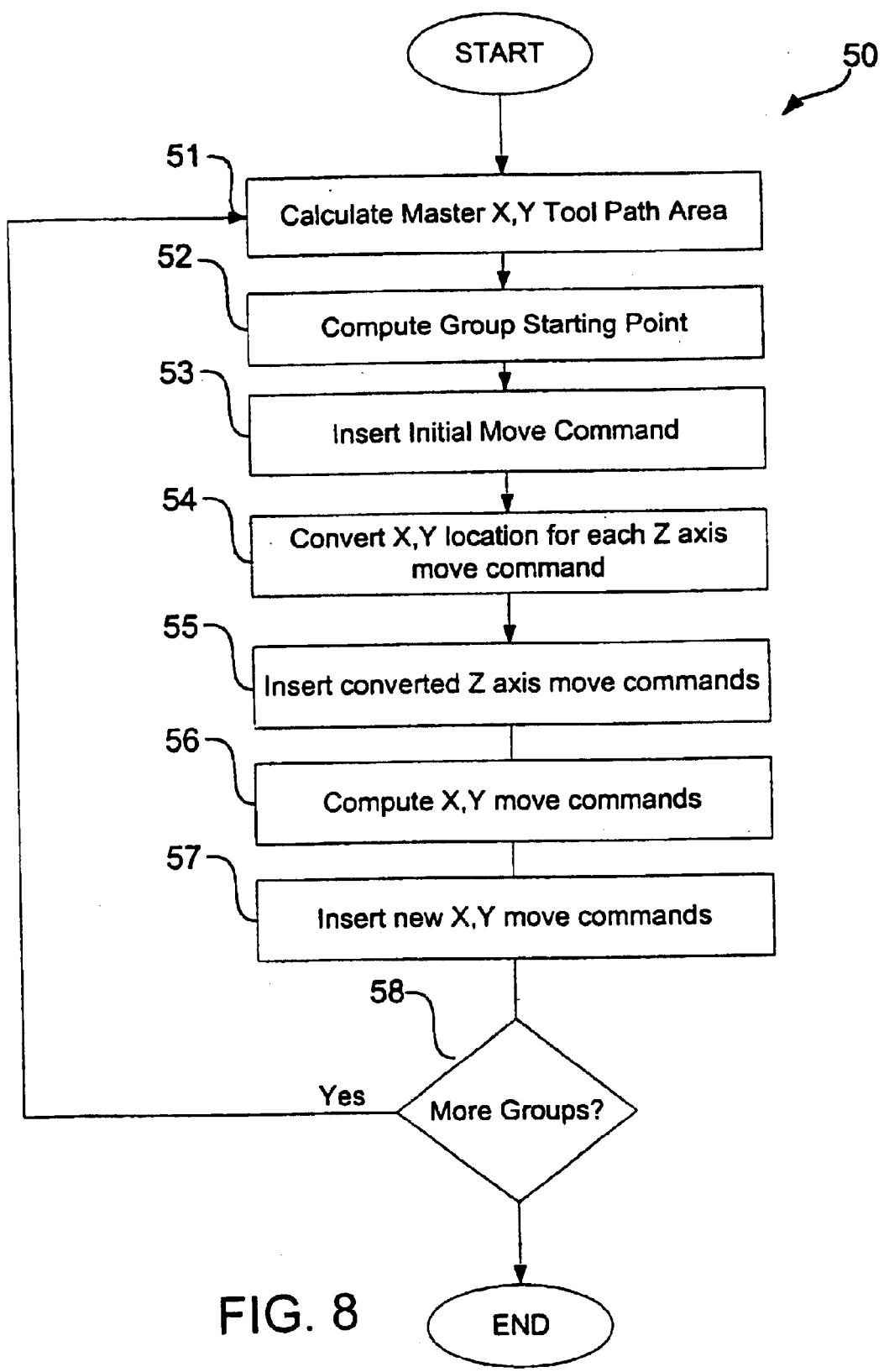
FIG. 8 is a flowchart illustrating merging the part programs to form the master program.

FIG. 8 is a flowchart illustrating a process 50 in which merge software modules 14 of control unit 4 process part programs 10 and generate master program 16. In order to merge part programs 10, control unit 4 identifies which part program has the largest X, Y traverse path and uses that X, Y traverse path area as a master tool path size for the motion commands of group (step 51). Alternatively, the operator can manually enter the master tool path size. Merge software modules 14 then examine all individual part programs 8 to calculate a group starting point (step 52). Upon calculating the group starting point, merge software modules 14 inserts an initial rapid traverse move command to move the cutting instruments from the machine home position to the group starting position (step 53).

Next, merge software modules 14 examine each part program 10 and identify each move command along the Z-axis. For each identified Z-axis move command, merge software modules 14 convert the X, Y location, which is relative to a starting point for the corresponding part program 10, to a new X, Y location relative to the group's starting point (step 54). Merge software modules 14 then insert each converted Z-axis move command in sequence into master program 16 (step 55). It is possible that Z-axis move commands for different part programs 10 will have the same X, Y location. In this case, merge software modules 14 insert each move command in master program 16 for sequential processing.

After inserting the Z-axis move commands, merge software modules 14 compute a new X, Y move command to traverse the distances between the Z-axis move commands based upon the group's defined cutting strategy and cutting direction (step 56). Merge software modules 14 insert the X, Y move commands into master program 16 between the Z-axis move commands in order to complete the tool paths.

After inserting the X, Y move commands, merge software modules 14 repeat the process for each group within master program 16 (step 58). Once all of the groups defined within part programs 10 have been processed, merge software modules 14 insert a rapid traverse command to move the cutting instruments back into machine home position. The result of process 50 is a master program that contains all Z-axis move commands of part programs 10 sequenced along common X, Y traverse paths based on the cutting strategy and cutting direction for each defined part group. Control unit 4 can, therefore, control machining system 6 according to master program 16 in order to simultaneously produce a number of different parts 8.

FIG. 9 illustrates an example merge report produced by merge software modules 14 after generating master program 16 from part programs 10. The example merge report summarizes various processing data and statistics for master program including one or more part groups. For example, the example merge report lists three part groups, A140, A141 and B323. For each part group, the example merge report lists a home position, a path step size, a step over size, a cutting strategy, a cutting direction, a master template size, the individual CNC programs merged to form the part group, the assigned cutting instrument for each CNC program and the total inches for each cutting instrument and the part group.

Various embodiments of the invention have been described. These and other embodiments are within the scope of the following claims.

What is claimed is:

1. A method comprising:
   merging part programs into a master part program by
   identifying Z-axis move commands within the part programs,
   modifying an X,Y location for each Z-axis move command, and
   inserting updated Z-axis move commands into the master part program, and
   controlling a machine according to the master part program to cause independently movable cutting instruments to simultaneously machine different parts defined by the part programs.

2. The method of claim 1, wherein merging the part programs further comprises:
   assigning each part program to a corresponding one of the cutting instruments; and generating move commands for the master part program, wherein each move command specifies an X, Y location that is common to the cutting instruments.

3. The method of claim 2, wherein each move command of the master program specifies a Z location for each cutting instrument.

4. The method of claim 1, wherein merging the part programs comprises generating a set of X,Y move commands to sequentially move the cutting instruments to the modified X, Y locations.

5. The method of claim 4, wherein generating the set of X,Y move commands includes generating the set of X,Y move commands as a function of a selected cutting direction and a selected cutting strategy.

6. The method of claim 4, wherein generating the set of X,Y move commands includes computing an X,Y traverse distance for each X,Y move command.

7. The method of claim 1, wherein merging the part programs comprises defining part groups within the master program.

8. A computer-readable medium having instructions stored thereon to cause a programmable processor to:
   merge a plurality of part programs into a master part program, including
   identify Z-axis move commands within the part programs,
   modify an X,Y location for each Z-axis move commands, and
   insert updated Z-axis move commands into the master part program; and
   control a machining system according to the master part program to cause independently movable cutting instruments to simultaneously machine different parts defined by the part programs.

9. The computer-readable medium of claim 8, wherein the instructions cause the programmable processor to:
   assign each part program to a corresponding one of the cutting instruments; and
   generate move commands for the master part program, wherein each move command specifies an X, Y location that is common to the cutting instruments.

10. The computer-readable medium of claim 9, wherein the instructions cause the programmable processor to generate the move commands of the master program such that each move command specifies a Z location for each part program.

11. The computer-readable medium of claim 8, wherein the instructions cause the programmable processor to:
    calculate a group starting point; and
    compute a new X,Y location for each Z-axis move command relative to the group starting point.

12. The computer-readable medium of claim 8, wherein the instructions cause the programmable processor to generate a set of X,Y move commands to sequentially move the cutting instruments to modified X, Y locations.

13. The computer-readable medium of claim 12, wherein the instructions cause the programmable processor to generate the set of X,Y move commands as a function of a selected cutting direction and a selected cutting strategy.

14. The computer-readable medium of claim 12, wherein the instructions cause the programmable processor to compute an X,Y traverse distance for each X,Y move command.

15. The computer-readable medium of claim 8, wherein the instructions cause the programmable processor to define part groups within the master program.

16. A system comprising:
    a machine system having a plurality of independently movable cutting instruments;
    software configured to receive a plurality of part programs and merge the part programs into a master program, the software being configured to:
    identify Z-axis move commands within the part programs,
    modify an X,Y location for each Z-axis move command, and
    insert updated Z-axis move commands into the master part program; and
    a control unit to interpret a master program to simultaneously control the cutting instruments.

17. The system of claim 16, wherein the control unit controls the machining system to simultaneously produce a plurality of parts.

18. The system of claim 16, wherein the software execute in an operating environment provided byte control unit.

19. The system of claim 16, wherein the software are configured to:
    assign each part program to a corresponding one of the cutting instruments; and
    generate move commands for the master part program, wherein each move command specifies an X, Y location that is common to the cutting instruments.

20. The system of claim 19, wherein the software are configured to generate the move commands of the master program such that each move command specifies a Z location for each part program.

21. The system of claim 16, wherein the software modules are configured to:
    calculate a group staffing point; and
    compute a new X,Y location for each Z-axis move command relative to the group starting point.

22. A method comprising:
    receiving a plurality of part programs; and
    merging the part programs into a master part program to define movements of cutting instruments used to produce parts so that a time period for producing one of the parts overlaps with another time period for producing another of the parts.

23. The method of claim 22, wherein merging the part programs comprises assigning each part program to a corresponding one of the cutting instruments.

24. The method of claim 22, wherein merging the part programs comprises generating move commands for the master part program, wherein each move command specifies an X, Y location that is common to the cutting instruments.

25. The method of claim 24, wherein each move command of the master program specifies a Z location for each cutting instrument.

26. A method comprising:
generating a master part program based on part programs, the master part program comprising commands to move cutting instruments to produce different parts defined by the part programs,
the commands comprising a first command that causes the cutting instruments to move in a common direction dining a first time period,
the commands comprising a second command that causes at least two of the cutting instruments to move in different directions or in a common direction and different distances during a second time period.

27. The method of claim 26 in which the first command comprises sub-commands for controlling movements of each cutting instrument.

28. The method of claim 26 in which the second command comprises sub-commands for controlling movements of each cutting instrument.

29. The method of claim 26 in which the first command also causes the cutting instruments common distance during the first time period.

30. The method of claim 26 in which the commands cause the cutting instruments to alternate between a first mode of movement and a second mode of movement, in the first mode of movement the cutting instruments moving in a common direction, and in the second mode of movement at least two of the cutting instruments moving in different directions or in a common direction and different distances.

31. The method of claim 26 which the first time period does not overlap the second time period.

32. A method comprising:
controlling a machine according to a master part program to cause independently movable cutting instruments to simultaneously machine different parts defined by part programs, the master part program having been merged from the part programs, and controlling the machine includes controlling a first set of independently movable cutting instruments to machine the different parts during a first time period, and controlling a second set of independently movable cutting instruments to machine the different parts during a second time period.

33. The method of claim 32 in which at least some of the first set of cutting instruments have sizes that are different from the second set of cutting instruments.

34. The method of claim 32 in which the first time period does not overlap the second time period.

35. The method of claim 32 in which controlling the machine comprises controlling the cutting instruments to cut along a first direction during a first time period and to cut along a second direction at an angle to the first direction during a second time period.

36. The method of claim 35 in which the first time period does not overlap the second time period.

37. The method of claim 32 in which controlling the machine comprises moving the cutting instruments in a common direction during a first time period, and moving at least two of the cutting instruments in different directions or in a common direction and different distances during a second time period.

38. The method of claim 37 in which the first time period does not overlap the second time period.

39. A computer-readable medium having instructions stored thereon to cause a programmable processor to:
control a machine according to a master part program to cause independently movable cutting instruments to simultaneously machine different parts defined by part programs, the master part program having been merged from the part programs, the instructions causing the programmable processor to control a first set of independently movable cutting instruments to machine the different parts during a first time period, and to control a second set of independently movable cutting instruments to machine the different parts during a second time period.

40. The computer-readable medium of claim 39 in which the instructions also cause the programmable processor to control the cutting instruments to cut along a first direction during a first time period and to cut along a second direction at an angle to the first direction during a second time period.

41. The computer-readable medium of claim 39 in which the instructions also cause the programmable processor to control the machine to move the cutting instruments in a common direction during a first time period, and to move at least two of the cut instruments to move in different directions or in a common direction and different distances during a second time period.

* * * * *